United States Patent [19]

Horiuchi et al.

[11] Patent Number: 4,881,449
[45] Date of Patent: Nov. 21, 1989

[54] HYDRAULIC BOOSTER DEVICE

[75] Inventors: Makota Horiuchi; Atsushi Shimizu, both of Ueda; Yoshitaka Miyakawa; Kazuya Sakurai, both of Wako, all of Japan

[73] Assignees: Nissin Kogyo Kabushiki Kaisha, Ueda; Honda Giken Kogyo Kabushiki Kaisha, Tokyo, both of Japan

[21] Appl. No.: 262,366

[22] Filed: Oct. 25, 1988

[30] Foreign Application Priority Data

Oct. 26, 1987 [JP] Japan ................. 62-270025

[51] Int. Cl.$^4$ .............................................. F15B 9/10
[52] U.S. Cl. ........................................ 91/372; 91/374; 91/391
[58] Field of Search ................. 91/368, 370, 378, 391, 91/372, 373, 374; 60/547.1

[56] References Cited

U.S. PATENT DOCUMENTS

| 3,253,409 | 5/1966 | Kellogg et al. | 60/547.1 X |
| 3,696,615 | 10/1972 | Grabill et al. | 60/54.6 |
| 3,894,390 | 7/1975 | Belart et al. | 60/552 |
| 3,926,093 | 12/1975 | Nakagawa | 91/391 |
| 3,958,423 | 5/1976 | Hayashida et al. | 91/391 R X |
| 4,280,395 | 7/1981 | Shaw | 91/391 R X |

FOREIGN PATENT DOCUMENTS

| 2645471 | 4/1978 | Fed. Rep. of Germany | 60/547.1 |
| 2069079 | 8/1981 | United Kingdom | 60/547.1 |

Primary Examiner—Robert E. Garrett
Assistant Examiner—Mark A. Williamson
Attorney, Agent, or Firm—Armstrong, Nikaido, Marmelstein, Kubovcik & Murray

[57] ABSTRACT

A hydraulic booster device comprises a booster cylinder coupled with a rear end of a cylinder body of a master cylinder, a booster piston slidably received in a piston guide mounted in the booster cylinder and spring-biased in a retreating direction, a valve piston connected to an operating member and slidably received in the booster piston, an output hydraulic pressure chamber defined to face a back of the booster piston, an input hydraulic pressure chamber leading to a hydraulic pressure supply source, an inlet valve interposed between the input and output hydraulic pressure chambers and opened in response to the advancing operation of the valve piston relative to the booster piston, an outlet valve interposed between the output hydraulic pressure chamber and an outlet chamber leading to an oil reservoir and closed in response to the advancing operation of the valve piston relative to the booster piston, and a booster chamber facing a back of the operating piston and defined between the operating piston and a guide member disposed rearwardly of the operating piston to be able to abut against a leading end of the booster piston. The valve piston has a leading end which is oil-tightly and movably passed through the guide member to project into said booster chamber, and the valve piston is perforated with an oil supply passage which permits the communication between the input hydraulic pressure chamber and the booster chamber as the inlet valve is opened.

7 Claims, 3 Drawing Sheets 4,881,449

HYDRAULIC BOOSTER DEVICE

BACKGROUND OF THE INVENTION

1. FIELD OF THE INVENTION

The present invention relates to a hydraulic booster device and particularly, to a hydraulic booster device for use in a brake system for vehicles.

2. DESCRIPTION OF THE PRIOR ART

There are conventionally known such hydraulic booster devices of a so-called strokeless type in which the stroke of an operating member is slight required only to open and close a hydraulic pressure control valve, and devices of a stroke type in which the stroke of an operating member is the same as that of an operating piston in a master cylinder, for example, as disclosed in Japanese Patent Publication No. 39953/78.

In a hydraulic booster device of the above strokeless type, however, there is a sense of incompatibility because the stroke of the operating member is slight and the amount of operation does not correspond to the amount of movement. In addition, when there is a falling of hydraulic pressure, the stroke increases, leading to a difficult layout of a seat of a hydraulic pressure control valve and so on. In a hydraulic booster device of the stroke type, the stoke of the operating member is too large. To shorten the stroke, the inside diameter of a cylinder body in the master cylinder may be increased, which causes the effectiveness to be deteriorated when there is a falling of hydraulic pressure.

SUMMARY OF THE INVENTION

With such circumstances in view, it is an object of the present invention to provide a hydraulic booster device wherein any stroke can be achieved.

To accomplish the above object, according to the present invention, there is proposed a hydraulic booster device, comprising a booster cylinder coupled with a rear end of a cylinder body of a master cylinder, a booster piston slidably received in a piston guide mounted in the booster cylinder and spring-biased in a retreating direction, a valve piston connected to an operating member and slidably received in the booster piston, an output hydraulic pressure chamber defined to face a back of the booster piston, an input hydraulic pressure chamber leading to a hydraulic pressure supply source, an inlet valve interposed between the input and output hydraulic pressure chambers and opened in response to the advancing operation of the valve piston relative to the booster piston, an outlet valve interposed between the output hydraulic pressure chamber and an outlet chamber leading to an oil reservoir and closed in response to the advancing operation of the valve piston relative to the booster piston, and a booster chamber facing a back of the operating piston in the master cylinder and defined between the operating piston and a guide member disposed rearwardly of the operating piston to be able to abut against a leading end of the booster piston, the valve piston having a leading end oil-tightly and movably passed through the guide member to project into the booster chamber, the valve piston being perforated with an oil supply passage which permits the communication between the input hydraulic pressure chamber and the booster chamber as the inlet valve is opened.

With the above device of the present invention, the range of the stroke of the operating member corresponding to the output hydraulic pressure can be set in any one by adjusting the load of the spring for biasing the booster piston in the retreating direction as well as the pressure-receiving area of the booster piston facing the output hydraulic pressure chamber. Therefore, the stroke of the operating member can be in a range intermediate between those of the prior art strokeless and stroke types and this makes it possible to overcome a sense of incompatibility.

In addition, a cylindrical member may be fixed to the cylinder body. The operating piston may be slidably received in the cylindrical member, and the guide member may be slidably fitted in a rear portion of the cylindrical member. If doing so, the guide member can be slided. This makes it possible to provide a relatively large stroke of the operating member and also a provide a relatively large length of the guide member in order to satisfactorily guide the valve piston. Further, the piston guide may be slidably fitted in the booster cylinder such that a retreat limit thereof is defined by the booster cylinder, and an annular hydraulic chamber may be defined between the booster cylinder and the piston guide to lead to a hydraulic pressure supply source and to bias the piston guide in a retreating direction. A return spring may be interposed between the piston guide and the booster cylinder for biasing the piston guide in the retreating direction, and the booster piston may be biased by the action of a stroke adjusting spring interposed between the booster piston and the piston guide. With such construction, when there is a falling of hydraulic pressure, the stroke adjusting spring advances along with the piston guide through operation of the operating member, and this makes it possible to relatively reduce the operating force for compressing the stroke adjusting spring.

The above and other objects, features and advantages of the invention will become apparent from reading of the following description of the preferred embodiments, taken in conjunction with the accompanying drawings.

BRIEF DESCRIPTION OF THE DRAWINGS

FIG. 2 is a characteristic graph.

DESCRIPTION OF THE PREFERRED EMBODIMENTS

Figure 1:
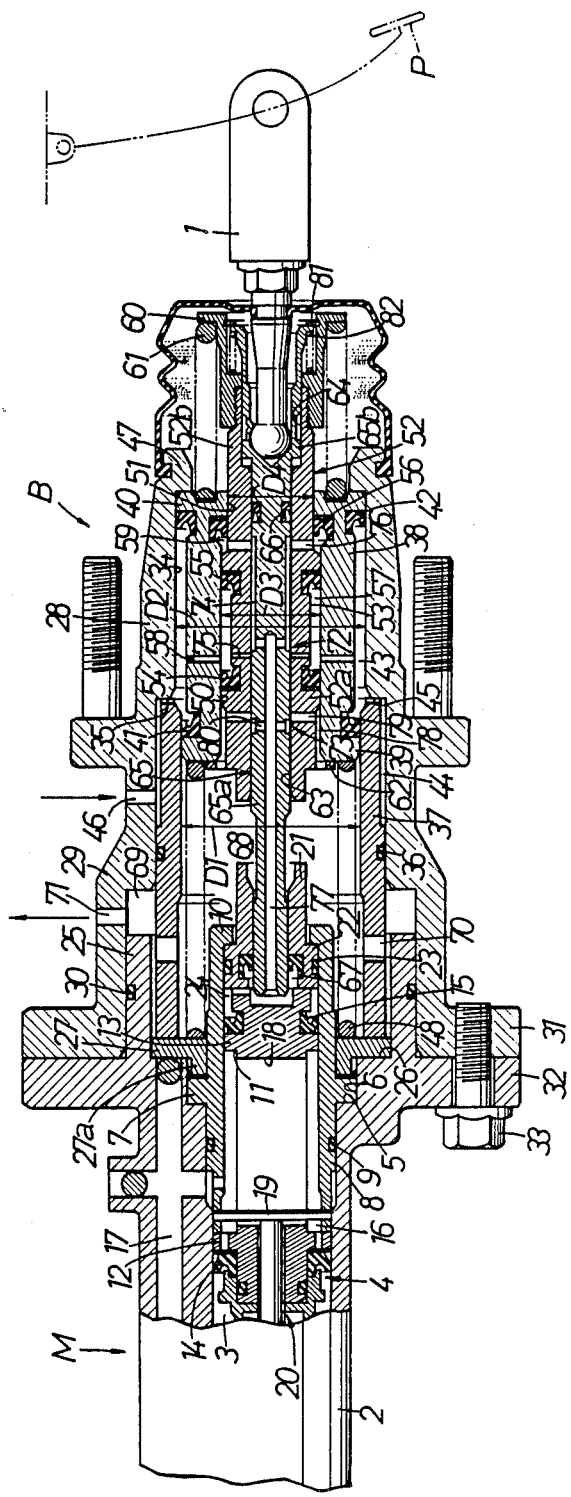
FIGS. 1 and 2 illustrate a device according to a first embodiment of the present invention, FIG. 1 being a side view in longitudinal section of the device.

Embodiments of the present invention will now be described with reference to the accompanying drawings. Referring first to FIG. 1 illustrating a first embodiment of the present invention, a hydraulic booster device is used for a brake system carried on an automobile and comprises a hydraulic booster B connected to a rear portion of a master cylinder M. Upon depression of a brake pedal P, a push rod 1 as an operating member operatively connected to the brake pedal P is advanced in response to the depressing operation of the brake pedal P, thereby producing the boosting operation of the booster B, so that a hydraulic braking pressure is produced in the master cylinder M.

The master cylinder M is a tandem type master cylinder and includes a cylinder body 2 in which are slidably received a front operating piston (not shown) defining a hydraulic chamber between a front end wall of the cylinder body 2, and a rear operating piston 4 defining another hydraulic chamber 3 between the front operating piston. A spring (not shown) is interposed between the front end wall of the cylinder body 2 and the front operating piston for biasing that operating piston rearwardly, and a spring (not shown) is interposed between the front operating piston and the rear operating piston 4 for biasing the piston 4 rearwardly. Thus, forward urging of the rear operating piston 4 allows the volumes of the front hydraulic chamber and the rear hydraulic chamber 3 to be contracted, so that hydraulic braking pressures are delivered out of the hydraulic chambers 3.

A larger diameter fitting hole 6 is provided in a rear end of the cylinder body 2 through a stepped portion or shoulder 5. A cylindrical member 8 is fitted in the rear end of the cylinder body 2 with a sealing member 9 interposed therebetween, and has its intermediate, outer surface a jaw 7 which abuts against the stepped portion or shoulder 5. A rear portion of the cylindrical member 8 projects rearwardly from the cylinder body 2, and the cylindrical member 8 includes a radially projecting restricting-jaw 10 provided at its rear end over the entire periphery. The operating piston 4 is provided with a pair of lands 12 and 13 at an axially spaced apart distance with an annular groove 11 intervening therebetween, and a cap seal 14 is fitted on the front land 12 in slidable contact with an inner surface of the cylinder body 2. In addition, the rear land 13 is inserted in the cylindrical member 8 and has a cap seal 15 fitted thereon in slidable contact with an inner surface of the cylindrical member 8. This defines an annular supplement oil chamber 16 between both the lands 12 and 13. Moreover, the front land 12 and the cap seal 14 are arranged to permit flowing of a working oil from the supplement oil chamber 16 into the hydraulic chamber 3 when the hydraulic chamber 3 is depressurized lower than the supplement oil chamber 16. The cylinder body 2 and the cylindrical member 8 are provided with a supplement oil passage 17 which permits the supplement oil chamber 16 to communicate with an oil reservoir which is not shown.

The operating piston 4 is perforated with an elongated hole 18 which extends along one diametrical line at a section extending between the lands 12 and 13, and a stopper pin 19 passed through the elongated hole 18 is fixed at its opposite ends to the cylindrical member 8. A valve mechanism 20 is disposed at a front portion of the operating piston 4 to provide the connection and disconnection between the hydraulic chamber 3 and the supplement oil chamber 16 and is urged and opened by the stopper pin 19 when the operating piston 4 has been returned to a retreat limit, i.e., when the rear end of the operating piston 4 has abutted against a guide member 21 fitted in the rear portion of the cylindrical member 8.

The guide member 21 is basically formed into a cylindrical shape to have at its front end a jaw 22 abutting against the restricting jaw 10 from the inner side, and is fitted in the cylindrical member 8 with its rear end portion projecting rearwardly from the rear end of the cylindrical member 8. A seal member 23 is fitted on an outer surface of the jaw 22 in contact with the inner surface of the cylindrical member 8. This defines a booster chamber 24 within the cylindrical member 8 between the operating piston 4 and the guide member 21, with a back of the operating piston 4 facing the booster chamber 24, so that the operating piston 4 advances as the hydraulic pressure in the booster chamber 24 increases.

A cylindrical connecting portion 25 projects from the rear end of the cylinder body 2 to concentrically surround the cylindrical member 8, with a step or shoulder 26 formed between the connecting portion 25 and the fitting hole portion 6. A circular ring-like clamping member 27 is mounted to abut against the step or shoulder 26 and has a cylindrical urging portion 27a which projects into the fitting hole portion 6 to clamp the jaw 7 of the cylindrical member 8 between the step 5.

The hydraulic booster B includes a booster cylinder 28 which is provided at its front portion with a cylindrical connecting portion 29 into which the cylindrical connecting portion 25 can be fitted. A seal member 30 is fitted on an outer surface of the cylindrical connecting portion 25 in contact with an inner surface of the cylindrical connecting portion 29. In addition, the cylindrical connecting portion 29 is provided at its leading end with a flange 31 which is coupled with a flange 32 provided at a base end of the cylindrical connecting portion 25 of the cylinder body 2 by a plurality of bolts 33, thereby connecting the master cylinder M and the hydraulic booster B.

A cylinder bore 34 is made in the booster cylinder 28 coaxially with the operating piston 4, and a step or shoulder 35 is provided between the cylinder bore 34 and the cylindrical connecting portion 29 to face to the master cylinder M. A cylindrical guide member 37 is mounted to abut at its rear end against the step or shoulder 35 and at its front end against the clamping member 27 and has on its outer surface a seal member 36 in contact with an inner surface of the cylindrical connecting portion 29. Thus, with the cylinder body 2 and the booster cylinder 28 coupled with each other, the clamping member 27 and the cylindrical guide member 37 are clamped between the cylinder body 2 and the booster cylinder 28 while axially abutting against each other, whereby the cylindrical member 8 is also fixed to the cylinder body 2.

The inside diameter D1 of the cylindrical guide member 37 is set to be smaller than the D2 of the cylinder bore 34 (D1<D2), and basically, a cylindrical piston guide 38 is slidably received in the cylindrical guide member 37 and the booster cylinder 28. The piston guide 38 has, at its front end, a land 39 slidably fitted in the cylindrical guide member 37 and at its rear end, a land 40 slidably fitted in the cylinder bore 34. A cap seal 41 is fitted on the land 39 in slidable contact with an inner surface of the cylindrical guide member 37, while a cap seal 42 is fitted on the land 40 in slidable contact with an inner surface of the cylinder bore 34. This defines an annular hydraulic chamber 43 between the cylindrical guide member 37 and the booster cylinder 28 and the piston guide 38. On the other hand, an annular oil chamber 44 is defined between the booster cylinder 28 and the cylindrical guide member 37 and communicates with the annular hydraulic chamber 43 through an oil passage 45 extending between a notch provided at a rear end of the cylindrical guide member 37 and the step or shoulder 35. Further, the booster cylinder 28 is perforated with an inlet oil passage 46 permitting a hydraulic pressure supply source (not shown) to communicate with the oil chamber 44, and a hydraulic pressure from the hydraulic pressure supply source is constantly supplied into the annular hydraulic chamber 43. Moreover, since D1<D2 as described above, the piston guide 38 is urged rearwardly by the hydraulic pressure of the annular hydraulic chamber 43, so that the piston guide 38 is in a retreat limit position in which the land 40 abuts against a restricting jaw 47 provided at the rear end of the booster cylinder 28, unless there is a falling of hydraulic pressure. A return spring 48 is mounted in compression between the front end of the piston guide 38 and the clamping member 27 held down to the rear end of the cylinder body 2 in the master cylinder M for urging the piston guide 38 toward the retreat limit position when a falling of hydraulic pressure is produced.

The piston guide 38 is perforated with a first cylinder bore 50 having an inside diameter D3 and a second cylinder bore coaxially connected to a rear end of the cylinder bore 50 and having an inside diameter D4 smaller than the inside diameter D3 (D3>D4), and a booster piston 52 is slidably received in the first and second cylinder bores 50 and 51. More specifically, the booster piston 52 is basically formed into a cylindrical shape to have a larger diameter portion 52a slidably fitted in the first cylinder bore 50 and a smaller diameter portion 52b connected to a rear end of the larger diameter portion 52a and slidably fitted in the second cylinder bore 51. In addition, an annular groove 53 is provided in the larger diameter portion 52a of the booster piston 52. Cap seals 54 and 55 are fitted, in slidable contact with an inner surface of the first cylinder bore 50, on opposite end edges of the annular groove 53 along an axial direction of the larger diameter portion 52a, while a cap seal 56 is fitted on a wall of the second cylinder bore 51 in the piston guide 38 in slidable contact with the smaller diameter portion 52b of the booster piston 52.

An annular input hydraulic pressure chamber 57 is defined by the annular groove 53 between the piston guide 38 and the larger diameter portion 52a of the booster piston 52, and an oil passage 58 is made in the piston guide 38 for permitting the input hydraulic pressure chamber 57 to communicate with the annular hydraulic chamber 43. An output hydraulic pressure chamber 59 is also defined between the piston guide 38 and the booster piston 52 to face a back of the larger diameter portion 52a of the booster piston 52.

A cylindrical receiving member 60 is threadedly connected to a rear end of the booster piston 52, and a stroke adjusting spring 61 is mounted in compression between the receiving member 60 and the rear end of the piston guide 38 for biasing the booster piston 52 rearwardly. Further, a radially outwardly projecting restricting-jaw 62 is integrally provided at a front end of the booster piston 52 to be able to abut against the front end of the piston guide 38, thereby providing a retreat limit of the booster piston 52 relative to the piston guide 38.

The booster piston 52 is perforated concentrically with a front smaller diameter cylinder bore 63 and a rear larger diameter cylinder bore 64, and a valve piston 65 connected to the push rod 1 as an operating member is slidably received in the cylinder bores 63 and 64. Specifically, the valve piston 65 comprises a smaller diameter portion 65a slidably fitted in the smaller diameter hole 63 with a seal member 66 interposed therebetween, and a larger diameter portion 65b slidably fitted in the larger diameter bore 64 and coaxially connected to the smaller diameter portion 65a, and the push rod 1 is coaxially connected to a rear end of the larger diameter portion 65b. In addition, a leading end of the smaller diameter 65a of the valve piston 65 is slidably passed through the guide member 21 to project into the booster chamber 24. Moreover, a seal member 67 is fitted on the inner surface of the guide member 21 in slidable contact with an outer surface of the smaller diameter portion 65a.

An outlet chamber 68 is defined between the clamping member 27 of the master cylinder M and the cylindrical member 8 and the front end of the booster piston 52 to have an outer periphery bounded by the cylindrical guide member 37. An annular oil passage 69 is also defined between the cylindrical connecting portion 25 and 29 and the cylindrical guide member 37 and communicates with the outlet chamber 68 through a communication hole 70 made in the cylindrical connecting portion 25. Further, the cylindrical connecting portion 29 is perforated with an outlet oil passage 71 communicating with the annular oil passage 69 and connected to an oil reservoir which is not shown. It follows that the outlet chamber 68 leads to the oil reservoir.

The booster piston 52 and the valve piston 65 constitute two valves: an inlet valve 72 for permitting the communication and blocking the communication between the input hydraulic pressure chamber 57 and the output hydraulic pressure chamber 59, and an outlet valve 73 for permitting the communication and blocking the communication between the output hydraulic pressure chamber 59 and the outlet chamber 68.

The inlet valve 72 is comprised of an annular recess 74 provided on an intermediate, outer surface of the valve piston 65, and an inlet valve bore 75 made in the booster piston 52 in communication with the input hydraulic pressure chamber 57. The annular recess 74 is provided relatively long in an axial direction of the valve piston 65, and the inlet valve bore 75 is made to extend along a radial direction of the booster piston 52. Moreover, the booster piston 52 is perforated with a communication hole 76 for permitting the annular recess 74 to normally communicate with the output hydraulic pressure chamber 59 irrespective of the axial relative movement of the valve piston 65.

Such inlet valve 72 is opened when the inlet valve bore 75 is brought into communication with the annular recess 74, and the positions of the inlet valve bore 75 and the annular recess 74 are established such that the inlet valve bore 75 is positioned in front more than the annular recess 74 in a closed state when the valve piston 65 is at its retreat limit relative to the booster piston 52.

In addition, the valve piston 65 is perforated with an oil supply passage 77 axially extending from an intermediate portion of the valve piston 65 to a leading end thereof, with a rear end of the oil supply passage 77 being normally in communication with the annular recess 74. Thus, when the inlet valve 72 has been opened, a hydraulic pressure is supplied into the oil supply passage 77. A front end of the oil supply passage 77 communicates with the booster chamber 24 and hence, the hydraulic pressure is also supplied into the booster chamber 24 upon opening of the inlet valve 72.

The outlet valve 73 is comprised of a first outlet valve bore 79 made in the booster piston 52 in communication with an annular chamber 78 defined between the piston guide 38 and the front end of the booster piston 52 to communicate with the outlet chamber 68, and a second outlet valve bore 80 made in the valve piston 65 in communication with the oil supply passage 77. Both the outlet valve bores 79 and 80 are made to extend along radial directions of the booster piston 52 and the valve piston 65 at corresponding places. In such outlet valve 73, when the valve piston 65 is at its retreat limit relative to the booster piston 52, the first and second outlet valve bores 79 and 80 are slightly open in communication with each other. Upon starting of advancing movement of the valve piston 65 relative to the booster piston 52, the outlet valve 73 is closed before the inlet valve 72 is opened. Moreover, when the outlet valve 73 is open, the oil supply passage 77 is in communication with the outlet chamber 68, so that the hydraulic pressure in the booster chamber 24 and the output hydraulic pressure chamber 59 is released.

A circlip 81 is fitted in the receiving member 60 threadedly connected to the rear end of the booster piston 52 to abut against the rear end of the valve piston 65 for providing the retreat limit of the valve piston 65. Also, a spring 82 is provided in compression between the receiving member 60 and the rear end of the valve piston 65, so that the valve piston 65 is biased rearwardly by the spring 82.

The operation of this embodiment will be described below. When the brake pedal P is inoperative, the valve piston 65 is maintained at the retreat limit relative to the booster piston 62 by a spring force of the spring 82, and the booster piston 52 is at the retreat limit relative to the piston guide 38 by an action of the stroke adjusting spring 61. Moreover, the piston guide 38 is at its retreat limit where the land 40 at its rear end abuts against the restricting jaw 47, under the influence of the hydraulic pressure supplied into the annular hydraulic chamber 43. In such condition, the inlet valve 72 is closed, while the outlet valve 73 is open and hence, the output hydraulic pressure chamber 59 and the booster chamber 24 are at atmospheric pressure.

When the brake pedal P is depressed down in this condition to brake the automobile, the valve piston 65 is urged forwardly from the brake pedal P through the push rod 1, so that the outlet valve 73 is first closed and then, the inlet valve 72 is opened. This causes a hydraulic pressure to be introduced from the input hydraulic pressure chamber 57 into the booster chamber 24, so that the operating piston 4 advances upon reception of the hydraulic pressure on its back, thus starting a boosting operation of the master cylinder M.

Now, when the inlet valve 72 has been opened, the hydraulic pressure is supplied into the booster chamber 24 as just described above, and the hydraulic pressure is also supplied into the output hydraulic pressure chamber 59, so that the booster piston 52 also advances relative to the valve piston 65 by reception of the hydraulic pressure on its back. Therefore, the inlet valve 72 is closed, while the outlet valve 73 is opened. The operating piston 4 advances under the influence of the hydraulic pressure acting on the booster chamber 24 before closing of the inlet valve 72 and opening of the outlet valve 73, so that the output hydraulic pressure from the master cylinder M suddenly increases as indicated by a characteristic line $P_0$-$P_1$ illustrated by a solid line in FIG. 2. This allows a play at each of portions up to the end of the brake to be immediately eliminated.

After the output hydraulic pressure has reached a point $P_1$, the valve piston 65 advances depending upon the amount of depression of the brake pedal P, wherein the advancing movement of the valve piston 65 relative to the booster piston 52 and the advancing movement of the booster piston 52 relative to the valve piston 65 are alternately repeated, so that opening and closing of the inlet valve 72 and the outlet valve 73 are alternately repeated. Therefore, the hydraulic pressure of the booster chamber 24, i.e., the amount of advancing movement of the operating piston 4 also increases depending upon the amount of advancing movement of the valve piston 65, and the output hydraulic pressure from the master cylinder M increases depending upon the stroke as indicated by the characteristic line.

After the leading end of the booster piston 52 has abutted against the guide member 21 as a result of advancing movement thereof, the advancing operation of the booster piston 52 is blocked. Thereafter, only the valve piston 65 advances with the inlet valve 72 remaining opened under the influence of a depressing force on the brake pedal P. However, when the hydraulic pressure of the booster chamber 24 becomes larger than the depressing force on the brake pedal P, the valve piston 65 is pushed back to close the inlet valve 72. When the brake pedal P is continued to be further depressed down, the valve piston 65 advances again to open the inlet valve 72. Repeating of such action causes the hydraulic pressure of the booster chamber 24 to suddenly increase as indicated by a characteristic line $P_2$-$P_3$ in FIG. 2. When the depressing force on the brake pedal P becomes larger than the hydraulic pressure (supplied oil pressure) of the booster chamber 24, the valve piston 65 advances at a dash. However, the leading end of the larger diameter portion 65b of the valve piston 65 abuts against the rear end of the smaller diameter portion 52b of the booster piston 52 on the side of the larger diameter cylinder bore 64 and hence, the advancing movement of the valve piston 65 is stopped in a slight amount as indicated by a characteristic line $P_3$-$P_4$ in FIG. 2, and the stroke operation is stopped. Moreover, the advancing or retreating movement of the valve piston 65 is an extremely small movement for opening or closing of the inlet valve 72 and hence, the operational feeling cannot be impaired.

When the brake pedal P is released to release the operation of the master cylinder M, the valve piston 65 first closes the inlet valve 72 and then opens the outlet valve 73 under the influence of the spring force of the spring 82. This causes the hydraulic pressure of the booster chamber 24 to be released, so that the operating piston 4 retreats to the retreat limit, while the hydraulic pressure in the output hydraulic pressure chamber 59 is released. Thus, the booster piston 52 rapidly retreats under the influence of the spring force of the stroke adjusting spring 61 until the restricting jaw 62 thereof abuts against the land 39 at the front end of the piston guide 38.

Figure 2:
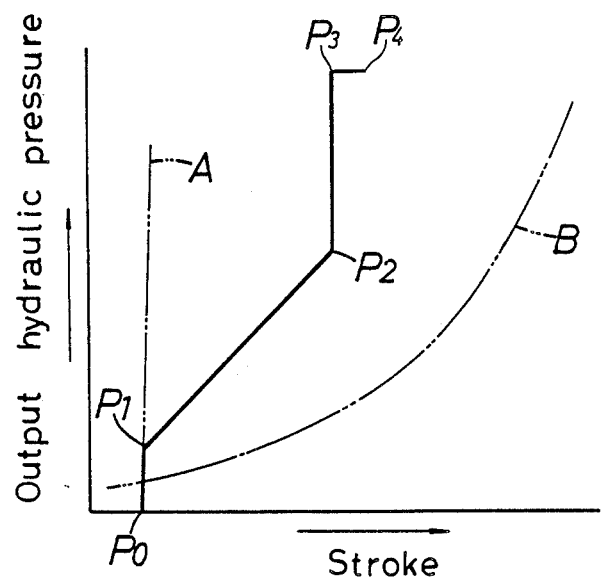

In such hydraulic boosting device, the characteristic line $P_1$-$P_2$ in FIG. 2 depends upon the balance between the oil pressure for urging the booster piston 52 forwardly by the hydraulic pressure of the output hydraulic pressure chamber 59 and the spring force for biasing the booster piton 52 rearwardly by the stroke adjusting spring 61, due to the inside diameter D3 larger than the inside diameter D4 (D3 > D4). The range of the output hydraulic pressure from the master cylinder M corresponding to the stroke can be established in any one by adjusting the inside diameters D3 and D4 and the load of the stroke adjusting spring 61. Accordingly, as compared with the strokeless type indicated by a chain line A in FIG. 2, it is possible to eliminate a sense of incompatibility with the amount of operation corresponding to the amount of movement in any range, and as compared with the strokeless type indicated by a chain line B in FIG. 2, it is possible to shorten the stroke.

Suppose that a falling of hydraulic pressure has been produced in the hydraulic boosting device. In this case, the hydraulic pressure is reduced and hence, the piston guide 38 is maintained at the retreat limit by the action of the return spring 48. Therefore, when the brake pedal P is depressed down to provide the braking operation, the valve piston 65 advances while compressing the spring 82 and further, the booster piston 52 and the piston guide 38 advance while compressing the stroke adjusting spring 61 and the piston guide 38. Consequently, the valve piston 65 abuts against the rear end of the operating piston 4 to urge the piston 4 forwardly. This causes an output hydraulic pressure to be produced from the master cylinder M. The stroke adjusting spring 61 moves along with the piston guide 38 and hence, only a relatively small operating force is required for compressing the stroke adjusting spring 61. The advancing movements of the valve piston 65, the booster piston 52 and the piston guide 38 continue until the leading end of the booster piston abutting against the guide member 21 abuts against the rear end of the cylindrical member 8 while urging the guide member 21 into the cylindrical member 8. This enables a sufficient output hydraulic pressure to be derived from the master cylinder M. Accordingly, it is possible to provide a sufficient hydraulic braking pressure even when there is a falling of hydraulic pressure. Moreover, because the guide member 21 is slidable within the cylindrical member 8, the guide member 21 can be set relatively long while assuring the stroke of the valve piston 65 when there is a falling of hydraulic pressure. Setting of the guide member 21 relatively long in this way ensures that guiding of the valve piston 65 can be achieved satisfactorily.

Figure 3:
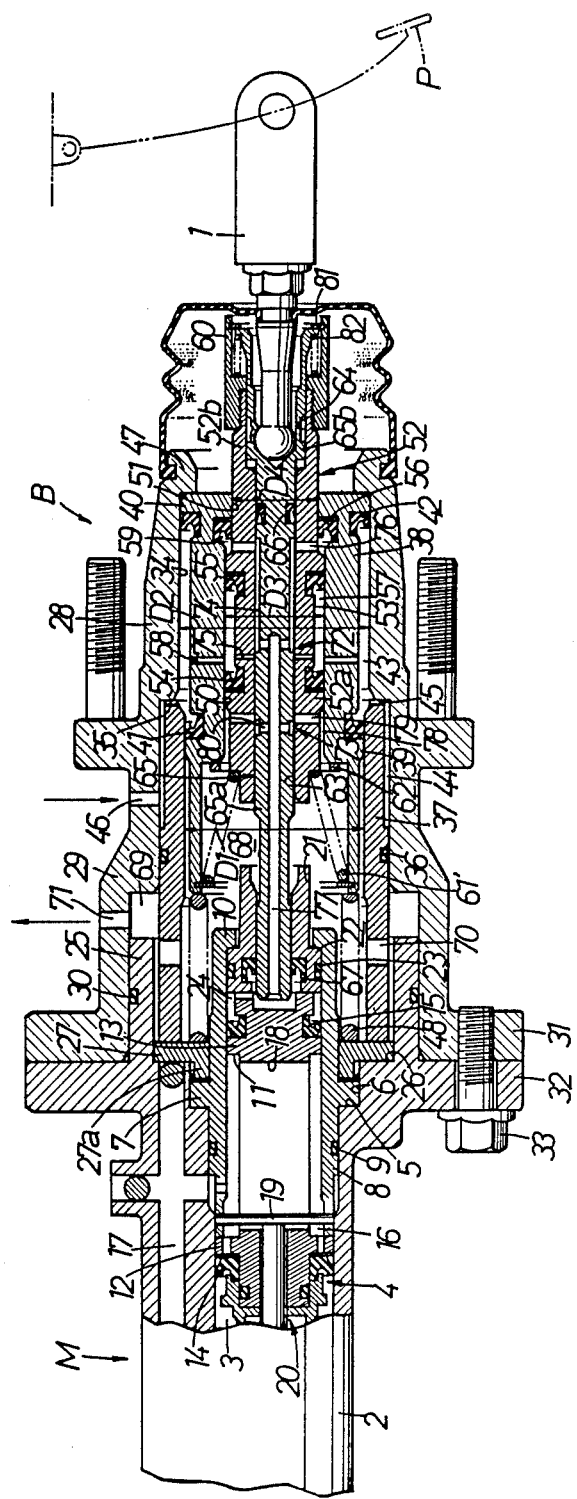
FIG. 3 is a side view in longitudinal section of a device according to a second embodiment of the present invention.

FIG. 3 illustrates a second embodiment of the present invention, which is different from the first embodiment in that a stroke adjusting spring 61' is mounted in compression between the front end of the booster piston 52 and the front end of the piston guide 38. Even with the second embodiment, the stroke adjusting spring 61' moves along with the piston guide 38 when there is a falling of hydraulic pressure and hence, only a relatively small operating force is required for compressing the stroke adjusting spring 61'.

When the hydraulic boosting device according to each of the above-described embodiments and an anti-lock brake system are carried on a vehicle, it is possible to moderate a kick-back phenomenon of the anti-lock brake system. This is because an increase in hydraulic pressure due to the kick-back produces an increase in hydraulic pressure in the output hydraulic pressure chamber 59, whereby the booster piston 52 moves forwardly to open the outlet valve 73.

What is claimed is

1. A hydraulic booster device, comprising a booster cylinder coupled with a rear end of a cylinder body of a master cylinder, a booster piston slidably received in a piston guide mounted in said booster cylinder and spring-biased in a retreating direction, a valve piston leading to an operating member and slidably received in said booster piston, an output hydraulic pressure chamber defined to face a back of said booster piston, an input hydraulic pressure chamber leading to a hydraulic pressure supply source, an inlet valve interposed between said input and output hydraulic pressure chambers and opened in response to an advancing operation of said valve piston relative to said booster piston, an outlet valve interposed between said output hydraulic pressure chamber and an outlet chamber leading to an oil reservoir and closed in response to an advancing operation of said valve piston relative to said booster piston, and a booster chamber facing a back of an operating piston in said master cylinder and defined between said operating piston and a guide member disposed rearwardly of said operating piston to be able to abut against a leading end of said booster piston, said valve piston having a leading end oil-tightly and movably passed through said guide member to project into said booster chamber, said valve piston being perforated with an oil supply passage which permits communication between said input hydraulic pressure chamber and said booster chamber in response to opening of said inlet valve.

2. A hydraulic booster device according to claim 1, wherein said piston guide includes a first cylinder bore and a second cylinder bore coaxially connected to said first cylinder bore and having a diameter smaller than that of said first cylinder bore, and said booster piston includes a larger diameter portion slidably fitted in said first cylinder bore, and a smaller diameter portion coaxially connected to a rear end of said larger diameter portion and slidably fitted in said second cylinder bore.

3. A hydraulic booster device according to claim 2, wherein said output hydraulic pressure chamber is defined between said piston guide and said booster piston to face a back of said larger diameter portion of said booster piston.

4. A hydraulic booster device according to claim 1, wherein said outlet valve is open when said valve piston is at a retreat limit relative to the booster piston, and said outlet valve is closed before opening of said inlet valve upon starting of the advancing motion of the valve piston relative to the booster piston.

5. A hydraulic booster device according to claim 1, further including a cylindrical member fixed to said cylinder body, said operating piston being slidably received in said cylindrical member, and said guide member being slidably fitted in a rear portion of said cylindrical member.

6. A hydraulic booster device according to claim 1, wherein said booster piston is biased in a retreating direction by the action of a stroke adjusting spring interposed between said booster piston and said piston guide.

7. A hydraulic booster device according to claim 5 or 6, wherein said piston guide is slidably fitted in said booster cylinder so that a retreat limit of the guide is provided by said booster cylinder; and further including an annular hydraulic chamber defined between said booster cylinder and said piston guide to lead to said hydraulic pressure supply source and to bias said piston guide in a retreating direction, and a return spring interposed between said booster cylinder and said piston guide for biasing said piston guide in the retreating direction.

* * * * *